United States Patent Office 3,281,492
Patented Oct. 25, 1966

3,281,492
VISCOSITY REDUCTION OF EPOXIDE COMPOSITIONS BY DILUTION WITH BIS(2,3-EPOXY-2-METHYLPROPYL) ETHER
Charles W. McGary, Jr., and Charles T. Patrick, Jr., both of South Charleston, W. Va., assignors to Union Carbide Corporation, a corporation of New York
No Drawing. Filed June 19, 1962, Ser. No. 203,457
25 Claims. (Cl. 260—830)

This invention relates to polyepoxide compositions. In one aspect, this invention relates to effectively reducing the viscosity of a polyglycidyl polyether of a polyhydric phenol to fit specific applications by incorporating therewith an amount of bis(2,3-epoxy-2-methylpropyl) ether, the resulting mixture upon curing exhibiting improved physical properties. In another aspect, this invention relates to curable, polymerizable compositions comprising bis(2,3-epoxy-2-methylpropyl) ether and a polyglycidyl polyether of a polyhydric phenol, and to the partially cured and cured composition resulting therefrom. In a further aspect, this invention is directed to the preparation of curable, partially cured, and cured compositions comprising bis(2,3-epoxy-2-methylpropyl) ether and a polyglycidyl polyether of a polyhydric phenol which can be modified by an active organic hardener to give a wide variety of useful properties and characteristics to said compositions.

In the synthetic resins art, it is known that specific epoxides and resins therefrom can be prepared having a variety of useful properties. These epoxides, which include the reaction products of epichlorohydrin and dihydric phenols, can be made into resins having properties which fit particular applications. In most instances, these epoxides, even with additional modifications, are rather limited in their use. Viscosity, for example, to a large degree limits the fields of uses of these epoxide or formulations containing these epoxides. In the manufacture of coatings, for example, it is desirable to use coating formulations which have viscosities which are neither so low that the formulation flows off the surface being coated nor so high that it is ardous or impossible to conveniently coat the surface. Moreover, if the coating is to be applied by spraying, a low viscosity formulation is preferable and when the coating is to be applied by brushing or wet lay-up procedures, a higher viscosity formulation is desired. Similarly, the viscosities of these epoxides, or formulations containing them, are largely determinative of the fields of use to which they may be put, for example, in the casting, molding or bonding arts and the like. Illustratively, in casting or molding, low viscosity epoxide formulations which quickly and completely fill intricacies of molds are preferred. Low viscosity formulations capable of accepting large amounts of solid materials, e.g., fillers and pigments, are desirable in coating as well as in casting, molding or bonding applications. Other higher viscosity epoxide formulations may be preferred in bonding applications, for example, as adhesives or for manufacturing laminates. Adjustments of the epoxide or epoxide formulation viscosity, which may be possible by increasing the temperature of the epoxide or epoxide formulation, or by the addition of non-reacting solvents or reactive diluents, tend to cause additional problems in preparing, applying and curing the formulations. In many instances, this adds new limitations to the physical and chemical properties of resins made from such formulations, thereby restricting their usefulness. In preparing epoxide formulations, increases in temperatures to reduce the viscosities of the epoxides for mixing with other components, such as hardeners, promote premature and localized curing, the expulsion of formulation components, or high exothermic heat accumulations during subsequent curing which can internally damage the resin. In addition, the application and curing of such epoxide formulations are made more difficult and expensive. When non-reacting solvents are employed to reduce viscosities additional steps or procedures and costly equipment need to be employed to remove the solvent when converting the epoxide formulation to a resin. Some solvent may be entrained in the resin, or may produce bubbles which are entrained in the resin, thereby causing irregularities and weak points. Entrained bubbles and solvent bring about defects in the physical properties, e.g., flexural strength, hardness, impact strength, heat distortion value, of resins containing them and, in addition, provide sites for chemical attack. Although reactive diluents may be employed to effect viscosity reduction, the differences of functionality, reactivity and/or volatility of the reactive diluent and the epoxide or epoxide formulation can be instrumental in causing irregularities and defects in resins made therefrom. Monofunctional diluents can cause undue shrinkage and drastic reductions in the physical properties of resin formulations. Difunctional diluents of low reactivity may be, in effect, only physically entrained in resins made from formulations diluted thereby and likewise cause reductions in resin properties. Highly reactive diluents may greatly increase the exotherms encountered when converting formulations containing them to resins. Uncontrolled exotherms can cause thermal decomposition of some formulation components as can be evidenced by charring and cause the expulsion of other components as can be evidenced by bubble formation and foaming. Volatile reactive diluents can be readily expelled from the formulations and similar to the effects of non-reactive solvents, form bubbles and foam. Other reactive diluents are extremely toxic and, hence, are not conducive to safe use in making resins.

Accordingly, one or more of the following objects will be achieved by the practice of this invention. It is an object of this invention to prepare novel curable, partially cured, and cured compositions comprising bis(2,3-epoxy-2-methylpropyl) ether and a polyglycidyl polyether of a polyhydric phenol. It is another object of this invention to prepare novel epoxide compositions comprising bis(2,3-epoxy-2-methylpropyl) ether and a polyglycidyl polyether of a polyhydric phenol wherein the viscosity of said compositions can be controlled to fit particular applications by controlling the amount of bis (2,3-epoxy-2-methylpropyl) ether in said compositions. A further object of this invention is directed to accelerating the cure rate of novel compositions comprising bis(2,3-epoxy-2-methylpropyl) ether and a polyglycidyl polyether of a polyhydric phenol by incorporating therein catalytic hardeners such as the strong mineral acids, alkali metal hydroxides, metal halide Lewis acids, and the like. A yet further object of this invention is directed to the preparation of novel curable, partially cured, and cured compositions comprising bis(2,3-epoxy-2-methylpropyl) ether and a polyglycidyl polyether of a polyhydric phenol which are modified by an active organic hardener such as polyfunctional amines, polycarboxylic acids, polycarboxylic acid anhydrides, polyols, and the like to give a wide variety of useful properties and characteristics to said compositions. Other objects of the present invention will readily become apparent to those skilled in the art in the light of the teachings herein set forth.

The present invention contemplates a new class of epoxide compositions comprising bis(2,3-epoxy-2-methylpropyl) ether and a polyglycidyl polyether of a polyhydric phenol which can be stored for long periods of time, e.g., six months and longer, without appreciable increases in viscosity or other signs of polymerization. These epoxide compositions can be prepared as solids, or liquids having viscosities as low as 50 centipoises at room temperature, i.e., approximately 25° C. The viscosities of the liquid epoxide compositions of the instant invention can be controlled, as desired, without the aid of external modifications such as raising the temperature or using non-reactive solvents or reactive diluents and the like, although such modifications may be employed, if desired. These epoxide compositions can be made with the capability of accepting wide varieties of solid materials such as fillers, pigments, and the like. The liquid epoxide compositions are particularly noteworthy in being capable of accepting large amounts of solid material without at the same time entraining large amounts of air or causing damage to the solid material particles. The epoxide compositions can be cured, i.e., polymerized, by catalysts, such as, mineral acids, metal halide Lewis acids, strong bases, and the like. They can be reacted with active organic hardeners, for example, polycarboxylic acids and halides, polyfunctional amines, polyhydric phenols and alcohols, polythiols, poylcarboxylic anhydrides, and the like to provide a wide variety of useful articles. The epoxide compositions of this invention have improved pot-lives which can be controlled, as desired, to fit specific needs. Such epoxide compositions can be made so as to cure rapidly (in the presence of catalysts and/or active organic hardeners), or they are capable of storage without incurring appreciable gelation for extended periods prior to use whichever the manufacturing techniques being employed may demand. The lowest temperatures at which the epoxide compositions can be easily cured can be adjusted, as desired, and compositions having minimum curing temperatures as low as 10° C., and lower, can be made in accordance with the instant invention. The compositions can be cured to resins which are uniform and do not contain foam, entrained solvent or bubbles. Exothermic heat evolved during the curing of the compositions is within easily controllable limits, and expensive equipment or extra procedures for removing excess heat is not required, although such techniques can be employed, if desired. During the curing of the compositions very little shrinkage, if any, occurs and resinous articles having intricately molded surfaces can be manufactured therefrom.

The resins of this invention can be made as infusible products which are insoluble in most chemicals and which have remarkable resistance to attack by strong acids and bases. These resins also can be made into tough, strong products having unusual flexibilty and which can be machined to a variety of shapes or polished to provide appealing finishes. In the form of coatings or laminates they are capable of tenaciously adhering to a wide variety of materials including such non-porous materials as glass and metals and have low coefficients of thermal expansion. Resins having improved flexural strengths and impact resistances can be made by the practice of the instant invention. Improved heat strengths are characteristic of resins which can be made from the compositions. Such resins are capable of supporting heavy loads at high temperatures and have heat distortion points as high as 150° C., and higher. The resins of this invention also can be made as hard articles having improved resistances to scratching and wear. They can be made in appealing colors with good color retention properties, and are useful in the manufacture of a variety of articles having decorative appearances.

By the term "polyglycidyl polyether of a polyhydric phenol," as used herein, is meant a polyepoxide compound having terminal epoxy groups, one or more aromatic nucleus or nuclei including fused aromatic nuclei, and at least two aliphatic groups including terminal epoxy-containing aliphatic groups, the aliphatic groups being united to said aromatic nucleus or nuclei through carbon to oxygen to carbon linkages. For brevity, polyglycidyl polyether of a polyhydric phenol is also hereinafter referred to as "polyglycidyl polyether(s)." By the term "epoxy group, epoxide or polyepoxide," as used herein, is meant a group or organic compound which contains adjacent carbon atoms to which oxirane oxygen is attached, for example

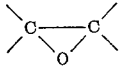

As stated previously, the broad aspect of the instant invention is directed to epoxide compositions comprising (a) bis(2,3-epoxy-2-methylpropyl) ether and (b) a polyglycidyl polyether of a polyhydric phenol. In general, the composition can contain from about 2 to about 98 weight percent of bis(2,3-epoxy-2-methylpropyl) ether based on the total weight of bis(2,3-epoxy-2-methypropyl) ether and polyglycidyl polyether; from about 10 to about 90 weight percent of bis(2,3-epoxy-2-methylpropyl) ether, based on the above-said total weight, is preferred.

The epoxide compositions of this invention can be prepared by mixing bis(2,3-epoxy-2-methylpropyl) ether with polyglycidyl polyethers of polyhydric phenols. It has been found advantageous to perform the mixing at a temperature which is not less than the softening point, or melting range, of the polyglycidyl polyether, although lower temperatures can be used, if desired. Mixing can be facilitated by using higher temperatures and agitation. These mixtures can be employed immediately or stored for long period without appreciable increases in viscosity or other signs of polymerization. They can be made as homogeneous solids or homogeneous liquids which remain homogeneous and have been found not to form separate phases despite changes in temperature. Compositions having many desired viscosities can be obtained by adjusting the relative proportions of bis(2,3-epoxy-2-methylpropyl) ether and polyglycidyl polyether. Those compositions which contain a greater weight percentage of bis(2,3-epoxy-2-methylpropyl) ether have been found to have lower viscosities than the corresponding systems which contain a relatively smaller weight percentage of bis(2,3-epoxy-2-methylpropyl) ether. Viscosities of these epoxide compositions can also be controlled through the selection of polyglycidyl polyethers, such that higher viscosity compositions can be made from higher viscosity polyglycidyl polyethers and lower viscosity compositions are obtainable from lower viscosity polyglycidyl polyethers. The melting points or softening ranges of the solid compositions have been found to be lower than those of their highest melting components. In addition, the softening ranges of these solid compositions can be controlled by adjustments in the relative proportions of bis(2,3-epoxy-2-methylpropyl) ether and polyglycidyl polyethers, those compositions containing a greater weight percentage of bis(2,3-epoxy-2-methylpropyl) ether possessing lower melting points than the corresponding systems which contain a relatively smaller weight percentage of bis(2,3-epoxy-2-methylpropyl) ether.

In one embodiment of this invention the epoxide compositions (or mixtures) containing bis(2,3-epoxy-2-methylpropyl) ether and a polyglycidyl polyether of a polyhydric phenol can be admixed with a catalyst and/or an active organic hardener, both to be described hereinafter in greater detail. The resulting admixture thus is a curable composition capable of being fully cured to the solid state. These curable compositions can be heated to a temperature in the range of from about 10° to about 250° C., preferably from about 20° to about 200° C., for a period of time sufficient to produce the product desired. Should a liquid product of a particular viscosity range be desired, the operator can terminate the heating step when such viscosity range has been reached. Likewise, if thermosetting solids (intermediate reaction products) or hard or infusible solids are desired, the heating step can be continued until the desired product is produced. Temperatures higher than 250° C. can be used although some discoloration which may not be desired may be brought about in curing to the resin. The time for effecting a partial cure or complete cure will be governed, to an extent, on several factors such as the particular polyglycidyl polyether employed, the proportions of bis(2,3-epoxy-2-methylpropyl) ether and polyglycidyl polyether used, the inclusion of a modifying quantity of an active organic hardener described hereinafter to the system, the temperature for effecting the degree of cure desired, the use of a catalytic quantity of a catalyst described hereinafter to the system, and other considerations. In general, the time for effecting the complete cure can vary from several minutes, e.g., five minutes, to about several days, e.g., one week, and longer, depending upon the correlation of such factors as noted above.

In forming the curable compositions the catalyst and/or active hardener is preferably mixed with the epoxide compositions so as to form curable compositions which are homogeneous. It has been observed that the pot-lives of the curable compositions can be controlled to fit various particular needs by varying the relative proportions of bis(2,3-epoxy-2-methylpropyl) ether and polyglycidyl polyether contained in the epoxide compositions employed. Illustratively, epoxide compositions which contain a greater weight percentage of bis(2,3-epoxy-2-methylpropyl) ether have been found to require longer times to gel when mixed with a catalyst or active organic hardener than the corresponding epoxide systems containing a smaller weight percentage of bis(2,3-epoxy-2-methylpropyl) ether.

In forming the curable mixtures from catalysts and epoxide compositions, an advantageous method is to add the catalyst to the composition at the lowest temperature required to form a liquid mixture. Mixing temperatures of 10° to 25° C. have been found to be advantageous. Stirring then can be employed to obtain a homogeneous, curable mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above can be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found, however, that catalyst concentrations from about 0.005 to 25.0 weight percent, based on the weight of epoxide composition, are advantageous in forming valuable thermoset resins from the curable compositions. Although higher concentrations can be employed, no particular advantage is apparent. Preferred catalyst concentrations are within the range of from about 0.005 to about 15.0 weight percent, based on the weight of epoxide composition. The mixtures of epoxide compositions and catalysts can be cured at temperatures up to 250° C. Temperatures over 250° C. may be used even though discoloration, which may be undesirable, may be caused. Discoloration which may be induced at temperatures over 250° C. can be reduced to a minimum, however, by lowering the catalyst concentration in the curable mixture. In the preferred method of curing, the mixture is brought to a temperature of about 50° C. to 150° C. until a gel, or partially cured solid, is formed. After formation of the gel, the temperature of the mixture is then maintained at an approximate temperature within the range of 100° C. to 200° C. to complete the cure. Although this is a preferred method, other single temperatures or combinations of temperatures, preferably none of which are higher than 250° C. can be used for curing.

In forming the curable mixtures from active organic hardeners and epoxide compositions, it is advantageous to first mix the active organic hardener in liquid form with the epoxide composition in liquid form. When the active organic hardener and epoxide composition are both in the liquid state at temperatures, for example, below about 30° C., they can be simply mixed together at room temperature and stirred to form a homogeneous, curable mixture. Higher temperatures may be used for mixing and in fact can facilitate the mixing, particularly when the active organic hardener or the epoxide composition or both are in solid state at room temperature. It is preferable to employ mixing temperatures which are elevated just high enough to place both the active organic hardener and epoxide compositions in the liquid states, so as to avoid any substantial degree of premature curing. Inasmuch as premature curing may not be disadvantageous and in fact may be desirable in particular circumstances, temperatures which are higher than those required to place both the active organic hardener and epoxide composition in liquid states can be used. Methods other than the preferred method for preparing curable mixtures from the epoxide compositions and active organic hardeners can be used, if desired. For example, solvents or reactive diluents can be employed to place the active organic hardener and epoxide composition in liquid form below about 30° C., or the active organic hardener or epoxide composition or both can be mixed in other than liquid form, as desired. The relative amounts of active organic hardener and epoxide composition can be varied over a wide range to produce a wide variety of useful products. Temperatures for effecting cures can be varied as desired but those below about 250° C. are preferred. Higher temperatures encourage a faster rate of cure while the lower temperatures effect a slower rate of cure. An advantageous method of curing these curable mixtures is to maintain the mixture at temperatures in the range of 50° C. to 150° C. until a gel, or partially cured solid, is formed. This gel is then maintained at a temperature in the 100° C. to 200° C. range to complete the cure. Other single curing temperatures or combinations of curing temperatures can be used. Catalysts can also be employed to quicken the rate of cure. Higher catalyst concentrations promote faster curing rates than lower concentrations in the same systems under correspondingly similar conditions. Although catalyst concentrations over a wide range may be used, it is preferred to employ them in concentrations of up to 5.0 weight percent, based on the weight of epoxide composition.

Polyglycidyl polyethers which can be advantageously used as a component in the epoxide compositions of this invention can be characterized by their epoxy equivalents and melting points, or melting point ranges. By the term "epoxy equivalent," as used herein, is meant the weight of polyglycidyl polyether which contains one mole of epoxy group. The epoxy equivalent can be determined by heating a one gram sample of the polyglycidyl polyether with a pyridine solution containing a known quantity of pyridine hydrochloride for about one hour and titrating with sodium hydroxide or potassium hydroxide to determine the amount of unreacted pyridine hydrochloride. From this, the amount of pyridine hydrochloride that was reacted with the epoxy groups of the polyglycidyl polyether can be calculated. From these data the number of grams of polyglycidyl polyether per epoxy group contained thereby, that is, the epoxy equivalent, can be determined by taking one mole of pyridine hydrochloride as equivalent to one mole of epoxy group. Melting point ranges, as used herein, were determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorohydrin in the presence of sufficient caustic alkali, or other strong aqueous alkali, e.g., potassium hydroxide, to combine with the chlorine of epichlorohydrin. It is preferable to use a stoichiometric excess of alkali so as to insure the complete combination of chlorine. Theoretically, one mole of epichlorohydrin will react with one hydroxyl group of polyhydric phenol to form the polyglycidyl polyether of the phenol. For example, two moles of epichlorohydrin are theoretically required to react with one mole of a dihydric phenol to form the diglycidyl diether of the phenol. In practice, however, a higher ratio than two moles of epichlorohydrin per mole of dihydric phenol is required and up to 10 moles of epichlorohydrin per mole of dihydric phenol has been required in order to form the diglycidyl diether of the phenol. The chain length and extent of polymerization can be varied by changing the mole ratio of epichlorohydrin to dihydric phenol within the range of 10:1 to 1.2:1. Thus, by decreasing the mole ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° C. to 100° C. by regulating the amount of water in the aqueous alkali added or by cooling the walls of the reaction vessel with a circulating cooling medium or by any other suitable cooling means. Towards the end of the reaction the addition of heat may be required to maintain the temperature of the reaction mixture at the desired level within the range from 50° C. to 100° C. The overall reaction time can be made to vary from thirty minutes to three hours or more depending upon the temperature, proportion of reactants and method of mixing the reactants. The polyglycidyl polyether product can be recovered from the reaction mixture by methods well recognized in the art.

The lower molecular weight polyglycidyl polyethers which can be formed as described above can be further polymerized by heating with less than equivalent amounts of the same, or different polyhydric phenol, to form longer chain polyglycidyl polyethers. For example, a diglycidyl diether of a dihydric phenol can be mixed with a less than equivalent amount of the same or different dihydric phenol. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalysts suitable for accelerating the rate of reaction include alkalis and alkaline reacting substances, acids, salts; basic nitrogen compounds, metallic surfaces and the like.

Typical halohydrins which can be used in the preparation of the polyglycidyl polyethers include monohalohydrins, such as 3-chloro-1,2-propanediol,
polyhalohydrins,
e.g.,
glycerol dichlorohydrin,
bis(3-chloro-2-hydroxylpropyl)ether,
bis(3-chloro-2-methyl-2-hydroxypropyl)ether,
2-methyl-2-hydroxy-1,3-dichloropropane,
1,4-dichloro-2,3-dihydroxybutane,
and the like, and
epihalohydrins,
such as,
epichlorohydrin which is preferred. Illustrative of polyhydric phenols which can be used in preparing polyglycidyl polyethers are mononuclear phenols and polynuclear phenols. Typical polyhydric phenols include resorcinol, catechol, hydroquinone, phloroglycinol and the like. Typical polynuclear phenols include p,p'-dihydroxydibenzyl,
p,p'-biphenol,
p,p'-dihydroxyphenyl sulfone,
p,p'-dihydroxybenzophenone,
2,2'-dihydroxy-1,1'-dinaphthylmethane,
and the 2,3'; 2,4'; 3,3; 3,4'; and 4.4';
isomers of dihydroxydiphenylmethane,
dihydroxydiphenyldimethylmethane,
dihydroxydiphenylethylmethylmethane,
dihydroxydiphenylmethylpropylmethane,
dihydroxydiphenylethylphenylmethane,
dihydroxydiphenylpropylphenylmethane,
dihydroxydiphenylbutylphenylmethane,
dihydroxydiphenyltolylmethane,
dihydroxydiphenyltolylmethylmethane,
dihydroxydiphenyldicyclohexylmethane,
dihydroxydiphenylcyclohexane,
polyhydric phenolicformaldehyde condensation products, and the like. Preferred polyglycidyl polyethers are those which contain as reactive groups only epoxy groups and hydroxyl groups. These preferred polyglycidyl polyethers have melting points or melting point ranges of not greater than 160° C.

The acidic and basic catalysts which can be employed include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ethyl ether complex, boron trifluoride-diethyl ether complex, boron trifluoride-dipropyl ether complex, and the like; the strong mineral acids, e.g., phosphoric acid, polyphosphoric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the stannous acylates, e.g., stannous acetate, stannous butyrate, stannous hexanoate, stannous octanoate, stannous benzoate, and the like; the stannic alkoxides, e.g., stannic butoxide, stannic 2-ethylhexoxide, and the like; the alkali metal hydroxides, e.g., sodium hydroxide, potassium hydroxide, and the like; the tertiary amines, e.g., trimethylamine, triethylamine, and the like. The boron trifluoride-amine complexes are highly preferred.

Uniform dispersions of catalyst in the curable compositions of this invention prior to curing have been found to be desirable in order to minimize local curing around catalyst particles. Agitation of the curable compositions as the catalyst is added is sufficient when the catalyst is miscible with the composition. When the two, i.e., catalyst and curable composition, are immiscible, the catalyst can be added as a solution in an organic solvent. Typical solvents for the catalysts include organic ethers, e.g., diethyl ether, propyl ether and the like; organic esters, e.g., methyl acetate, ethyl propionate, and the like; organic ketones, e.g., acetone, cyclohexanone, and the like. In addition, water can be employed as a solvent for the mineral acid and basic catalysts.

The bis(2,3-epoxy-2-methylpropyl) ether-polyglycidyl polyether systems of this invention, with or without the inclusion of a catalyst of the type illustrated above, can be reacted with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing said active organic hardener(s) to become thermoset resins in accordance with the teachings of the instant specification. The active organic hardeners can also be employed in varying amounts so as to give a wide variety of properties to the epoxide system, upon curing, as set forth herein.

The active organic hardeners which can be employed include polycarboxylic acids, polycarboxylic acid anhydrides, polyfunctional amines, polyols, polythiols, polyisocyanates, polyacyl halides, and the like. The active organic hardeners illustrated hereinafter can be employed in a curing amount, that is, an amount which is sufficient to cause the curable system comprising the epoxide component(s) to become a thermosetting or thermoset copolymeric resin in accordance with the teachings of the instant specification.

Representative polycarboxylic acids which are contemplated include, for instance, oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, and the like. It is desirable to employ the polycarboxylic acid and epoxide component in such relative amounts so as to provide from about 0.2 to about 2.0, and more preferably from about 0.3 to about 1.0, carboxy groups, i.e., —COOH groups, of said acid per epoxy group, i.e.

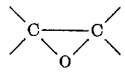

group, of said epoxide component.

Illustrative polycarboxylic acid anhydrides include, for example, phthalic anhydride,
tetrahydrophthalic anhydride,
maleic anhydride,
glutaric anhydride,
succinic anhydride,
nonenylsuccinic anhydride,
1,8-naphthalic anhydride,
lower alkyl substituted-bicyclo[2.2.1]hept-5-ene-
    2,3-dicarboxylic anhydride,
methylbicyclo[2.2.1]hept-2-ene-2,3-
    dicarboxylic anhydride, and the like. The polycarboxylic acid anhydride and epoxide component are employed in such relative amounts so as to provide from about 0.1 to about 4.0, and more preferably from about 0.4 to about 2.0, carboxy groups of said anhydride per epoxy group of said epoxide component. It should be noted that by the expression "carboxy groups of said anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of said anhydride" is meant the carboxy groups contained in the "hydrated" polycarboxylic acid anhydride.

Representative polyols include, by way of example, ethylene glycol, diethylene glycol, the polyethylene glycols, propylene glycol, the polypropylene glycols, 1,1,1-trimethylol-propane, the polyvinyl alcohols, the cyclopentanediols, the cyclohexanediols, resorcinol, catechol, bis(4-hydroxyphenyl)-2,2-propane, 1,8-naphthalenediol, and the like. It is pointed out that the term "polyol," as used herein, includes those organic compounds which have at least two hydroxy (—OH) groups and they can be alcoholic hydroxy groups, phenolic hydroxy groups, or both alcoholic and phenolic hydroxy groups. The term "polyol" preferably encompasses the polyhydric alcohols and the polyhydric phenols. In general, the proportions of polyol and epoxide component are such so as to provide from about 0.1 to about 2.0, and more preferably from about 0.2 to about 1.5, hydroxy groups of said polyol per epoxy group of said epoxide component.

Among the polyfunctional amines contemplated include the aliphatic amines, the aromatic amines, the aralkyl amines, the cycloaliphatic amines, the alkaryl amines, the aliphatic polyamines which include the polyalkylene polyamines, the amino-substituted monohydric and polyhydric aliphatic alcohols and phenols, the addition products of polyamines and low molecular weight epoxides containing oxirane oxygen linked to vicinal carbon atoms, and others. By the term "polyfunctional amine," as used herein, is meant an organic amine having at least two active amino hydrogen atoms which can be on the same nitrogen atom or on different nitrogen atoms. The relative proportions of polyfunctional amine and epoxide component provide from about 0.2 to about 5.0, and more preferably from about 0.3 to about 3.0, amino hydrogen atoms of the amine per epoxy group.

In general, the novel curable epoxide resin compositions can be conveniently prepared by admixing with the epoxides the desired epoxy polymerization catalyst, active organic hardener, or other desired components of the resin composition. Fillers of various sorts may also be employed if desired. The curing reaction may be accelerated by heat and post curing at elevated temperatures employed to improve heat-distortion, hardness, and like properties.

The epoxide compositions, and curable mixtures and resins made therefrom are useful in the manufacture of a large variety of useful articles such as combs, brush handles, garden furniture, radio cabinet parts, structural parts, in the potting of electrical parts and the manufacture of protective coatings. The epoxide compositions can be employed as heat and light stabilizers for chlorine-containing resins and can be employed in the manufacture of such condensation resins as phenol-formaldehyde resins, urea-formaldehyde resins, melamine-formaldehyde resins and the like to improve the physical properties, such as flexibility, of such resins. The curable mixtures can be cast or molded using simplified procedures to make numerous articles. These compositions can accept large amounts of a variety of fillers which can impart special properties to resins formed therewith. The curable compositions are also particularly useful in making easily-applied protective coatings and can be cured to hard, durable coatings which are tough, chip resistant and resistant to attack by chemicals and which adhere tenaciously to surfaces of a wide variety of materials including glass and metals. These mixtures are also useful as bonding agents in making adhesives, abrasive wheels, laminates and the like. The resins can be machined and polished to provide articles having various configurations and appealing appearances.

The curable compositions and partially cured compositions (intermediate reaction products that are viscous liquids or thermosetting solids), i.e., bis(2,3-epoxy-2-methylpropyl)ether-polyglycidyl polyether-active organic hardener systems, with or without the use of a catalyst, can be dissolved in a suitable organic solvent, such as, xylene, methyl isobutyl ketone, butyl acetate, ethyl acetate, toluene, amyl acetate, and the like. The compositions dissolved in the above exemplary list of solvents can be used as, for example, surface coating which can be subsequently heat cured to hard, tough, scratch-resistant coatings.

The proportion of partially cured resin, i.e., intermediate reaction products, to solvent will depend on various factors such as the particular mixture being cured, the degree or extent of the partial cure, the particular organic solvent employed, and other considerations. In general, a solution comprising from about 10 to about 90 weight percent of the partially cured resin, based on the total weight of partially cured resin and solvent, is suitable; from about 40 to 70 weight percent of the partially cured resin, based on the total weight of partially cured resin and solvent, is preferred. Moreover, the uncured compositions can be dissolved in the solvents exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to insure a more uniform coating on the surface.

In the following illustrative examples, Barcol hardness values were determined by the use of Barcol Impressor GYZJ–934–1 at a temperature of approximately 25° C.; Heat Distortion Point values of the resins were ascertained in accordance with ASTM method D–648–45T using 264 p.s.i. fiber stress. Unless otherwise indicated the description and examination of the resins were made at room temperature, i.e., approximately 25° C.

Examples 1–2

There was admixed 22 grams of bis(2,3-epoxy-2-methylpropyl) ether and 88 grams of diglycidyl diether of bis(4-hydroxyphenyl)-2,2-propane; a viscosity determination with a Brookfield Viscometer, model LVF, at 26° C., indicated a viscosity of 692 centipoises. The undiluted diglycidyl diether of bis(4-hydroxyphenyl)-2,2-propane had a viscosity of about 19,500 centipoises at 26° C.

Resins were then prepared from the above undiluted and diluted systems by mixing with a polyfunctional amine prepared by condensing 4 mols of diethylenetriamine with one mol of diglycidyl diether of bis(4-hydroxyphenyl)-2,2-propane. The epoxy resin mixture was such as to provide one amino hydrogen group per epoxy group contained in the diepoxide system. The diluted system containing bis(2,3-epoxy-2-methylpropyl) ether formed a gel in one hour at 26° C.; the undiluted system gelled after 55 minutes at 26° C. Both systems were cured for 6 hours at 160° C.; the resulting resins then were examined at room temperature. The resin containing bis(2,3-epoxy-2-methylpropyl) ether was clear and free of bubbles and cracks whereas the resin lacking bis(2,3-epoxy-2-methylpropyl) ether was sufficiently filled with bubbles so as to appear opaque. Other data and pertinent results are set forth in Table I below:

TABLE I.—COMPARISON OF DILUTED AND UNDILUTED RESIN SYSTEMS

| Example | System | Heat Distortion Point, ° C. | Barcol Hardness |
|---|---|---|---|
| 1 | Diluted [1] | 110 | 49 |
| 2 | Undiluted [2] | 111 | 32 |

[1] Three component system containing 1 part by weight of diglycidyl diether of bis(4-hydroxyphenyl)-2,2-propane per 4 parts by weight of bis(2,3-epoxy-2-methylpropyl) ether, and polyfunctional amino adduct in an amount so as to provide one amino hydrogen group per epoxy group contained in the system.
[2] Two component system containing diglycidyl diether of bis(4-hydroxyphenyl)-2,2-propane and polyfunctional amine adduct in amounts so as to provide one amino hydrogen group per epoxy group.

Examples 3–8

There were admixed, in varying proportions, bis(2,3-epoxy-2-methylpropyl) ether and diglycidyl diether of bis(4-hydroxyphenyl)-2,2-propane. The viscosities of the resulting mixtures at 26° C. were determined with a Brookfield Viscometer, model LVF. The compositions of the mixtures and the respective viscosities are set forth in Table II below:

TABLE II.—VISCOSITIES OF RESIN SYSTEMS CONTAINING BIS(2,3-EPOXY-2-METHYLPROPYL) ETHER

| Example | Bis(2,3-epoxy-2-methylpropyl) ether [1] | Diglycidyl Diether [1] [2] | Viscosity of Mixture,[3] Centipoises |
|---|---|---|---|
| 3 | 98 | 2 | 6.4 |
| 4 | 75 | 25 | 12.2 |
| 5 | 50 | 50 | 45.6 |
| 6 | 25 | 75 | 308 |
| 7 | 2 | 98 | 8,800 |
| 8 | 0 | 100 | 14,7000 |

[1] Weight percent of epoxide based on total weight of the system.
[2] Diglycidyl diether of bis(4-hydroxyphenyl)-2,2-propane.
[3] Determined at 26° C.

Examples 9–14

There was prepared a mixture containing 50 weight percent bis(2,3-epoxy-2-methylpropyl) ether and 50 weight percent diglycidyl diether of bis(4-hydroxyphenyl)-2,2-propane. The resulting mixture was then divided into several 1.12 gram portions. To each portion there was added a polyfunctional amine hardener. For purposes of comparison the polyfunctional amine hardeners were added to systems containing solely diglycidyl diether of bis(4-hydroxyphenyl)-2,2-propane. The pertinent data and results are set forth in Table III below:

TABLE III.—COMPARISON OF DILUTED AND UNDILUTED RESIN SYSTEMS CURED WITH POLYFUNCTIONAL AMINES

| Example | System | Grams | Polyfunctional Amine | Grams | Gel Time, Hours,° C. | Cure, Hours,° C. | Resin Description |
|---|---|---|---|---|---|---|---|
| 9 | Diluted [1] | 1.12 | Ethylenediamine | 0.15 | 5 hrs. at 26° | 22 hrs. at 26°, 2.5 hrs. at 80°, 6 hrs. at 120°, 6 hrs. at 160°. | Yellow, tough. |
| 10 | Undiluted [2] | 1.9 | ....do.... | 0.15 | 2.5 hrs. at 26° | 3 hrs. at 26°, 2 hrs. at 80°, 2 hrs. at 120°, 6 hrs. at 160°. | Yellow, tough, Barcol of 25. |
| 11 | Diluted [1] | 1.12 | m-Xylenediamine | 0.34 | 7–15 hrs. at 26° | 22 hrs. at 26°, 2.5 hrs. at 80°, 6 hrs. at 120°, 6 hrs. at 160°. | Pale yellow, tough, Barcol of 37. |
| 12 | Undiluted [2] | 1.9 | ....do.... | 0.34 | 2 hrs. at 26° | 3 hrs. at 26°, 2 hrs. at 80°, 2 hrs. at 120°, 6 hrs. at 160°. | Yellow, tough, Barcol of 35. |
| 13 | Diluted [1] | 1.12 | ....do.... | 0.34 | 7–15 hrs. at 26° | 22 hrs. at 26°, 2.5 hrs. at 80°, 6 hrs. at 120°, 6 hrs. at 160°. | Pale yellow, tough, Barcol of 37. |
| 14 | Undiluted [2] | 1.9 | ....do.... | 0.34 | 2 hrs. at 26° | 3 hrs. at 26°, 2 hrs. at 80°, 2 hrs. at 120°, 6 hrs. at 160°. | Yellow, tough, Barcol of 35. |

[1] Two component system containing 50 weight percent diglycidyl diether of bis(4-hydroxyphenyl)-2,2-propane and 50 weight percent bis(2,3-epoxy-2-methylpropyl) ether.
[2] System contains solely diglycidyl diether of bis(4-hydroxyphenyl)-2,2-propane.

Examples 15–17

There was admixed 30 grams of bis(2,3-epoxy-2-methylpropyl) ether and 30 grams of a polymeric diglycidyl diether of bis(4-hydroxyphenyl)-2,2-propane. The resulting admixture was then heated until homogeneous. This admixture had a viscosity of 710 centipoises at 27° C. as determined by the Brookfield Viscometer, model LVF. The resulting admixture was then divided into three 1.4 gram portions. To each portion there was added an active organic hardener. Subsequently, these portions were gelled and cured. The post cure was effected at 160° C. for 6 hours. The pertinent data and results are set forth in Table IV below:

TABLE IV.—DILUTED RESIN SYSTEM CURED WITH ACTIVE ORGANIC HARDENER

| Example | Organic Hardener | Grams | Ratio [1] | Gel Time, Hours, ° C. | Cure, Hours, ° C. | Resin Description |
|---|---|---|---|---|---|---|
| 15 | Diethylenetriamine | 0.2 | 1.0 | 4.7 hrs. at 26° | 21 hrs. at 26°, 2.5 hrs. at 80°, 6 hrs. at 120°. | Yellow, strong, Barcol, 25. |
| 16 | Methylenedianiline | 0.5 | 1.0 | 0.5 hr. at 120° | 6 hrs. at 120° | Amber, tough, Barcol, 40. |
| 17 | Maleic anhydride/ethylene glycol | 0.5/0.1 | 1.0/0.3 | 4 hrs. at 120° | 5.5 hrs. at 120° | Yellow, tough. |

[1] Amino hydrogen group (equivalent) of polyfunctional amine or carboxyl group (equivalent) of anhydride per epoxy group (equivalent) of the epoxide system.

Examples 18–20

There were admixed 30 grams of bis(2,3-epoxy-2-methylpropyl) ether and 30 grams of a polymeric diglycidal diether of bis(4-hydroxyphenyl)-2,2-propane. The resulting admixture was then heated until homogeneous. This admixture had a viscosity of 710 centipoises at 27° C. as determined by the Brookfield Viscometer, model LVF. The resulting admixture was then divided into three 1.4 gram portions. To each portion there was added a catalytic hardener. Subsequently, these portions were gelled and cured. The post cure was effected at 160° C. for 6 hours. The pertinent data and results are set forth in Table V below:

TABLE V.—DILUTED RESIN SYSTEM CURED WITH CATALYTIC HARDENER

| Example | Catalytic Hardener | Weight Percent [1] | Gel Time, Hours, ° C. | Cure, Hours, ° C. | Resin Description |
|---|---|---|---|---|---|
| 18 | KOH [2] | 0.46 | 0.3 hr. at 120° | 5.5 hrs. at 120° | Amber, tough, Barcol, 24. |
| 19 | $H_2SO_4$ [3] | 0.3 | 9 hrs. at 120° | 14 hrs. at 120° | Brown, tough. |
| 20 | BF$_3$-piperidine | 3.0 | | 21.5 hrs. at 120° | Amber, tough. |

[1] Weight percent of catalytic hardener, based on the total weight of epoxide.
[2] Added as a 17.2 weight percent solution in ethylene glycol.
[3] Added as a 15 weight percent solution $H_2O$.

Examples 21–24

There were admixed 30 grams of bis(2,3-epoxy-2-methylpropyl) ether and 30 grams of a polymeric diglycidyl diether of bis(4-hydroxyphenyl)-2,2-propane. The resulting admixture was then heated until homogeneous. This admixture had a viscosity of 80,000 centipoises at 26° C. as determined by the Brookfield Viscometer, model LVF. The resulting admixture was then divided into four 1.6 gram portions. To each portion there was added an active organic hardener or a catalytic hardener. Subsequently, these portions were gelled and cured. The post cure was effected at 160° C. for 6 hours. The pertinent data and results are set forth in Table VI below:

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A curable epoxide composition comprising a diglycidyl diether of a dihydric phenol and bis(2,3-epoxy-2-methylpropyl) ether.

2. A curable epoxide composition comprising a diglycidyl diether of a dihydric phenol and from about 2 to 98 weight percent of bis(2,3-epoxy-2-methylpropyl) ether based on the total weight of the epoxide components.

3. A curable epoxide composition comprising a diglycidyl diether of a dihydric phenol and from about 10 to 90 weight percent of bis(2,3-epoxy-2-methylpropyl) ether, based on the total weight of the epoxide components.

4. A curable epoxide composition comprising a diglycidyl diether of a dihydric phenol, bis(2,3-epoxy-2-methylpropyl) ether, and a polymerization catalyst therefor.

5. A curable epoxide composition comprising a diglycidyl diether of a dihydric phenol, bis(2,3-epoxy-2-methylpropyl) ether and an active organic hardener.

6. A curable epoxide composition comprising a diglycidyl diether of a dihydric phenol, bis(2,3-epoxy-2-methylpropyl) ether, and a polyfunctional amine.

7. A curable epoxide composition comprising a diglycidyl diether of a dihydric phenol, bis(2,3-epoxy-2-methylpropyl) ether, and a polyfunctional amine in such proportions as to provide 0.2 to 5.0 amino hydrogen atoms of the polyfunctional amine for each epoxy group of the epoxide composition.

8. A curable epoxide composition comprising a diglycidyl diether of a dihydric phenol, bis(2,3-epoxy-2-methylpropyl) ether, and a polycarboxylic acid.

9. A curable epoxide composition comprising a diglycidyl diether of a dihydric phenol, bis(2,3-epoxy-2-methyl- TABLE VI.—DILUTED RESIN SYSTEM CURED WITH ACTIVE ORGANIC HARDENER OR CATALYTIC HARDENER

| Ex. | Hardener | Grams | Ratio [1] | Gel Time, Hours, ° C. | Cure, Hours, ° C. | Resin Description |
|---|---|---|---|---|---|---|
| 21 | Diethylenetriamine | 0.2 | 1.0 | 4–18 hrs. at 26° | 19 hrs. at 26°, 2.5 hrs. at 80°, 6 hrs. at 120°. | Yellow, tough. |
| 22 | Phthalic anhydride | 1.1 | 1.5 | 0.85 hr. at 120° | 2.5 hrs. at 120° | Do. |
| 23 | Potassium hydroxide [2] | | | 0.85 hr. at 120° | 2 hrs. at 120° | Do. |
| 24 | BF$_3$-piperidine | 0.1 | | 1 hr. at 120° | 2 hrs. at 120° | Amber, tough. |

[1] Amino hydrogen group (equivalent) of polyfunctional amine or carboxyl group (equivalent) of anyhdride per epoxy group (equivalent) of the epoxide system.
[2] Added as a 17.2 weight percent solution in ethylene glycol.

propyl) ether, and a polycarboxylic acid in such proportions as to provide 0.3 to 1.25 carboxy equivalents of the polycarboxylic acid for each epoxy group of the epoxide composition.

10. A curable epoxide composition comprising a diglycidyl diether of a dihydric phenol, bis(2,3-epoxy-2-methylpropyl) ether, and a polycarboxylic acid anhydride.

11. A curable epoxide composition comprising a diglycidyl diether of a dihydric phenol, bis(2,3-epoxy-2-methylpropyl) ether, and polycarboxylic acid anhydride in such proportions as to provide 0.2 to 3.0 carboxy groups of the anhydride for each epoxy group of the epoxide composition.

12. A curable epoxide composition comprising a diglycidyl diether of a dihydric phenol, bis(2,3-epoxy-2-methylpropyl) ether and a polyol.

13. A curable epoxide composition comprising a diglycidyl diether of a dihydric phenol, bis(2,3-epoxy-2-methylpropyl) ether, and a polyol in such proportions as to provide from about 0.1 to 2.0 hydroxy groups of the polyol for each epoxy group of the epoxide composition.

14. The cured composition of claim 4.
15. The cured composition of claim 5.
16. The cured composition of claim 6.
17. The cured composition of claim 7.
18. The cured composition of claim 8.
19. The cured composition of claim 9.
20. The cured composition of claim 10.
21. The cured composition of claim 11.
22. The cured composition of claim 12.
23. The cured composition of claim 13.

24. A thermosetting intermediate reaction product resulting from the partial reaction of a composition comprising a diglycidyl diether of a dihydric phenol, bis(2,3-epoxy-2-methylpropyl) ether, and an active organic hardener, said intermediate reaction products being dissolved in an inert organic solvent, the resulting solution comprising from about 10 to 90 weight percent of said intermediate reaction products, based on the total weight of said intermediate reaction products and solvent.

25. A process for reducing the viscosity of a curable epoxide composition comprising a diglycidyl diether of a dihydric phenol which comprises admixing with said epoxide composition bis(2,3-epoxy-2-methylpropyl) ether.

References Cited by the Examiner
UNITED STATES PATENTS

| | | | |
|---|---|---|---|
| 2,982,752 | 5/1961 | Phillips et al. | 260—47 |
| 3,100,756 | 8/1963 | Fry | 260—47 |

SAMUEL H. BLECH, *Primary Examiner.*

DONALD E. CZAJA, *Examiner.*

J. J. KLOCKO, P. LIEBERMAN, *Assistant Examiners.*